(12) United States Patent
Niezgoda et al.

(10) Patent No.: US 11,072,382 B2
(45) Date of Patent: Jul. 27, 2021

(54) VEHICLE FOR THE AUTONOMOUS TRANSPORT OF AN OBJECT

(71) Applicant: Deutsche Post AG, Bonn (DE)

(72) Inventors: Denis Niezgoda, Cologne (DE); Ingo F. Bickel, Meckenheim (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 16/155,370

(22) Filed: Oct. 9, 2018

(65) Prior Publication Data
US 2019/0106167 A1 Apr. 11, 2019

(30) Foreign Application Priority Data
Oct. 10, 2017 (DE) ...................... 10 2017 123 491.8

(51) Int. Cl.
*B62D 59/04* (2006.01)
*G05D 1/02* (2020.01)
(Continued)

(52) U.S. Cl.
CPC ............ *B62D 59/04* (2013.01); *B60K 7/0007* (2013.01); *B60P 1/56* (2013.01); *B62D 21/20* (2013.01); *B62D 33/027* (2013.01); *B62D 63/02* (2013.01); *G05B 19/41895* (2013.01); *G05D 1/0214* (2013.01); *G05D 1/0274* (2013.01); *G05D 1/0289* (2013.01); *G08G 1/096827* (2013.01);
(Continued)

(58) Field of Classification Search
CPC ......... G05D 2201/0216; G05D 1/0289; B60Y 2200/49; G08G 1/096827; B62D 21/20; B62D 59/04; B62D 21/14; B62D 33/023; B62D 33/027; B62D 63/02; B60P 1/56; B60P 1/64; B60K 7/0007; G05B 19/41895
See application file for complete search history.

(56) References Cited

U.S. PATENT DOCUMENTS 3,561,620 A * 2/1971 Willis ..................... B66F 9/141
414/282
5,924,753 A * 7/1999 DiBassie ............ B62D 33/0273
296/26.09
(Continued)

FOREIGN PATENT DOCUMENTS

DE 10043578 A1 3/2002
DE 10325424 A1 12/2004
(Continued)

OTHER PUBLICATIONS

German Office Action issued in related DE102017123491.8 dated Jun. 26, 2018 and machine translation.
(Continued)

*Primary Examiner* — Ig T An
(74) *Attorney, Agent, or Firm* — Woodard, Emhardt, Henry, Reeves & Wagner, LLP (57) ABSTRACT

The disclosed is a vehicle for the autonomous transport of an object to a destination, having a loading bed for receiving the object, a side wall extending longitudinally around the loading bed and bounding a usable area of the loading bed, and a controller, wherein the loading bed is designed to alter the usable area, and the controller is designed to navigate the vehicle to the destination along a route that takes the alteration in the usable area into consideration.

18 Claims, 4 Drawing Sheets

(51) Int. Cl.
  *B62D 63/02* (2006.01)
  *B62D 33/027* (2006.01)
  *B60P 1/56* (2006.01)
  *B62D 21/20* (2006.01)
  *G05B 19/418* (2006.01)
  *B60K 7/00* (2006.01)
  *G08G 1/0968* (2006.01)

(52) U.S. Cl.
  CPC . *B60Y 2200/49* (2013.01); *G05B 2219/31007* (2013.01); *G05B 2219/32037* (2013.01); *G05D 2201/0216* (2013.01)

(56) References Cited

U.S. PATENT DOCUMENTS

| | | | | |
|---|---|---|---|---|
| 10,239,567 | B1* | 3/2019 | Parrish | B62D 33/08 |
| 2013/0325210 | A1 | 12/2013 | Palm | |
| 2014/0062128 | A1* | 3/2014 | Garchar | B62D 33/0273 |
| | | | | 296/183.1 |
| 2016/0129592 | A1* | 5/2016 | Saboo | B25J 5/007 |
| | | | | 700/248 |
| 2016/0214657 | A1* | 7/2016 | Topolovec | B62D 33/037 |
| 2017/0130405 | A1* | 5/2017 | Engelmann | B60R 1/00 |
| 2017/0158254 | A1* | 6/2017 | Singer | B62D 33/08 |
| 2017/0282979 | A1* | 10/2017 | Singer | B60R 19/32 |
| 2017/0309973 | A1* | 10/2017 | Haug | H01M 10/488 |
| 2017/0349037 | A1* | 12/2017 | Singer | B60J 7/041 |
| 2017/0361462 | A1* | 12/2017 | Chelian | B25J 5/005 |
| 2018/0058878 | A1 | 3/2018 | Roth | |
| 2018/0120863 | A1* | 5/2018 | Barra | B60N 2/005 |
| 2018/0339658 | A1* | 11/2018 | Frederick | B62D 33/023 |
| 2019/0041860 | A1* | 2/2019 | Jones | B60L 1/02 |
| 2019/0177088 | A1* | 6/2019 | Sullivan | B65G 1/0492 |
| 2019/0287047 | A1* | 9/2019 | Skaaksrud | G05D 1/0214 |

FOREIGN PATENT DOCUMENTS

| | | |
|---|---|---|
| DE | 102008023988 A1 | 9/2009 |
| DE | 102016004369 A1 | 10/2016 |
| DE | 202017101758 U1 | 6/2017 |

OTHER PUBLICATIONS

Machine translation of DE10043578A1 by Lexis Nexis Total Patent on Oct. 10, 2018 (pp. 21).

Machine translation of DE102008023988A1 by Lexis Nexis Total Patent on Oct. 10, 2018 (pp. 8).

Machine translation of DE10325424A1 by Lexis Nexis Total Patent on Oct. 10, 2018 (pp. 17).

Machine translation of DE202017101758U1 by Lexis Nexis Total Patent on Oct. 10, 2018 (pp. 38).

* cited by examiner

VEHICLE FOR THE AUTONOMOUS TRANSPORT OF AN OBJECT

CROSS-REFERENCE TO RELATED APPLICATIONS

This application claims priority to German Patent Application No. 10 2017 123 491.8 filed Oct. 10, 2017, which is hereby incorporated by reference.

TECHNICAL FIELD

The invention relates to a vehicle for the autonomous transport of an object to a destination, having a loading bed for receiving the object, a side wall extending longitudinally around the loading bed and bounding a base area of the loading bed, and a controller.

BACKGROUND OF THE INVENTION

Vehicles for the autonomous transport of an object to a destination are known from the prior art and designed for example as light trucks or picking carts. The latter variant is often an automated robot cart which automatically follows a warehouse employee during "picking", targeted finding of objects on the basis of a customer order in a warehouse or in a logistics centre, at a predetermined distance through a rack system of the logistics centre, in order that the warehouse employee can deposit the found objects in the picking cart. As soon as all the articles have been found or the picking cart has been filled, the warehouse employee sends the loaded picking cart to an unloading point, to which the picking cart automatically heads autonomously without any further manual action. A further, unloaded picking cart travels likewise autonomously and automatically to the warehouse employee, in order that the latter can load the further picking cart with further objects. In order to be able to move autonomously in the logistics centre, the picking carts have various sensors, using which the picking carts initially prepare a map of the logistics centre. During operation, the map is updated and exchanged between different picking carts, in order that changed conditions in the logistics centre can be identified by the individual picking carts and can be bypassed independently.

Although picking is considerably simplified by the described automation, since the warehouse employees have for example both hands free and do not have to push or pull a heavy hand cart manually behind them, the range of use of currently available picking carts is limited. This is because, as a result of the increase in online retail and the associated increase in picking operations in logistics centres in the form of warehouses, more flexible storage and picking solutions are demanded, in order for it to be possible to put together customer orders comprising only a few and also an extremely large number of objects using the described picking carts that have a limited usable area. Moreover, the warehouses are characterized by rack systems with different passage widths between the racks. As a result of the constant changeover of objects with very different dimensions, the passage widths in the logistics centres change regularly, with the result that the picking carts are faced with barely surmountable problems of moving autonomously in the logistics centre. Aisles that were passable only recently can quickly have a passage width that is too narrow and that the picking carts cannot manage.

SUMMARY

Proceeding from this situation, it is an object of the present invention to specify a vehicle for the autonomous transport of an object to a destination, which, compared with the vehicles known from the prior art, is usable much more flexibly with regard to the objects to be transported and takes changed passage widths into consideration during navigation to the destination.

The object is achieved by the features of the independent claim. Advantageous refinements are specified in the dependent claims.

Accordingly, the object is achieved by a vehicle for the autonomous transport of an object to a destination, having a loading bed for receiving the object, a side wall extending longitudinally around the loading bed and bounding a usable area of the loading bed, and a controller, wherein the loading bed is designed to alter the usable area, and the controller is designed to navigate the vehicle to the destination along a route that takes the alteration in the usable area into consideration.

In order to improve possible applications of a vehicle for the autonomous transport of an object, the invention proposes designing the usable area of the loading bed that is bounded by the side wall in an alterable manner and choosing the route of the vehicle to the destination in dependence on the altered usable area. Previous vehicles, known from the prior art, for the autonomous transport of an object to a destination, for example what are referred to as picking carts, are characterized by a fixedly defined usable area, which cannot be increased. In addition, a prerequisite for the autonomous navigation of such picking carts known from the prior art is that the size of the picking cart, in particular the width and length of the loading bed or of the picking cart, is precisely known, in order to autonomously navigate a route to the destination. The increase in online retail and the associated increase in picking operations demand more flexible solutions, however, which are satisfied by the proposed vehicle. This is because, in the case of the vehicle, as a result of the alteration in the usable area, for example an increase in a surface area, the usable area can be adapted to the number and size of the objects to be transported. In addition, the vehicle takes the altered usable area and optionally resultant changed passage widths into consideration during the autonomous transport of the objects for example from a picking location to a destination at which the picked objects are loaded for further transport. Rather than different vehicles each with loading beds or usable areas of different sizes, the proposed vehicle allows different transport requirements to be satisfied with only one vehicle type. In addition, it is not necessary to select the vehicle type before the object is transported, but rather, during a picking operation, the usable area can be adapted to the actual number and size of the objects to be transported.

In principle, the proposed vehicle can be any desired vehicle, in particular a light truck, a motor vehicle, a two-wheeler or a cart. In the scope of the invention, the term "autonomous" means that the vehicle is independently capable, without manual interaction, of transporting the object from a starting point to a destination, of covering a predefined path to the destination and/or of independently determining the path. The vehicle can have devices for manually navigating the path, but also be in the form of an automated robot cart without a driver's cab, steering wheel or the like. In the case of a picking cart, there is preferably no cab for a driver, such that, instead, in a comparable manner to a trailer, the loading bed or the usable area can represent external dimensions of the vehicle in plan view. Altering the usable area means in particular increasing and/or reducing a surface area of the loading bed. Accordingly, with an unaltered usable area, the surface area of the usable area corresponds to that of the loading bed. The controller is configured for example as a microprocessor and/or in a computer-based manner and is preferably designed to detect and/or to control the alteration in the usable area.

The object can be any desired transportable item, in particular merchandise, piece goods and/or a consignment. The object can be an item for everyday use, for example consumer materials or foodstuffs, and technical items or equipment. Likewise, consignments, for example letters, parcels and/or printed products such as leaflets, brochures or periodicals, can be included. Preferably, the vehicle is designed such that the loading bed can hold a plurality of objects that are able to be set down next to and/or on top of one another on the loading bed. Very particularly preferably, the vehicle is usable as a picking cart by a picker in a logistics centre, warehouse or distribution centre, in order first of all to hold objects removed from a rack system by the picker and then to transport them to the destination. The loading bed preferably has a rectangular and/or level usable area, on which the objects are receivable, in particular stackable. In addition to the use within a logistics centre, applications are also conceivable in which the vehicle transports the objects to one or more destinations, delivers them and/or receives them in the open, for example on a road, along a predefined or self-compiled path.

In principle, the altering of the usable area can comprise the altering of a surface area of the usable area and the altering of a geometric shape of the usable area, for example from a rectangular usable area to a square one with the same surface area. According to a preferred development, the usable area and/or a surface area of the loading bed is alterable in the longitudinal direction and/or in the transverse direction of the loading bed, and/or the loading bed is designed to alter the size of the usable area. According to a further preferred refinement, the loading bed is configured in a telescopically extendable and/or foldable manner for the purpose of alteration, in particular of altering the size. At the very least, the loading bed, and thus the usable area, can be altered in this way, in particular increased and/or reduced. Similarly, the loading bed can be designed in the manner of a roller shutter, a roller door or roller blind for the purpose of altering the size.

The usable area continues to be bounded by the side wall during and/or after the alteration. In this respect, simply turning down the side wall, as is possible for example in a trailer known from the prior art, is not understood to be altering the usable area in the scope of the invention. Preferably, the loading bed is designed such that the usable area is alterable during the transport of the object. In this way, the proposed vehicle makes it possible, for example during a picking operation that has already been started, to adapt the usable area dynamically to the size and number of objects to be transported. Preferably, the loading bed is designed to be telescopically extendable in two independent directions arranged orthogonally to one another. In this way, the loading bed can, in the case of a rectangular basic shape, be altered in size both in the longitudinal direction and in the transverse direction.

In principle, the loading bed and the side wall can extend at any desired angle to one another with regard to their surface normals. According to a preferred refinement, the loading bed and the side wall are arranged at a fixed angle to one another, however. Preferably, this fixed angle is 90° and relates to the respective surface normals. The loading bed and the side wall can be made of sheet metal, wood or a composite material. Similarly, the side wall can be embodied as a grating or made of a flexible material. In addition, the term "side wall" also includes sides or borders and thus not necessarily a wall. The side wall preferably extends continuously all the way round the usable area.

According to a preferred development, the side wall peripherally bounds the loading bed and/or the usable area, adjoins the loading bed without a gap, is arranged in a foldable manner on the loading bed and/or is arranged orthogonally to the loading bed. Preferably, the peripheral side wall and the loading bed form the shape of an upwardly open cuboid, in order to secure the objects against dropping off the loading bed by way of the side wall.

In addition to the altering of the usable area, in particular the altering of the size of the surface area of the loading bed, a further essential aspect of the invention is that according to a preferred development, the side wall is designed to be variable in length. To this end, the side wall can be configured in a telescopically extendable manner, configured in a foldable manner and/or made of a flexible material. During the telescopic extension, one or more parts of the side wall can be lowered within an outer part. Just like the usable area, the side wall can be configured such that size or length alterations are variable in a stepless manner, for example by screwing, or in defined steps, for example by latching. Similarly, the side face and/or the loading bed can be configured such that a part thereof is designed to be lowerable and to be extendable for increasing the size.

According to a preferred development, at least two side walls are provided, which are arranged alongside one another on adjacent peripheral edges of the loading bed, and a side-wall extension that is made of a flexible material and is arranged between the two side walls. The side-wall extension is preferably made of a flexible material such as rubber or the like and can be arranged within the side wall, in particular in a lowerable manner within the side wall. Upon extension of the side wall, the side-wall extension is pulled out of the side wall in the manner of a flexible rubber band and in this way bounds the usable area. An advantage of such a side-wall extension resides in the flexible formation of different lengths of the side wall.

In order that the vehicle can detect a change in length of the side wall and/or an alteration of the loading bed, in order consequently to adapt the route to the alteration in the usable area, it has been found to be particularly expedient for a marking to be provided on the side wall in order to visually display the change in length, and/or for a side-wall sensor designed to detect the change in length to be provided. Alternatively or additionally, it is preferred for a marking to be provided on the loading bed in order to visually display the alteration, and/or for the vehicle to have a loading-bed sensor designed to detect the alteration in size. By means of the marking, it is possible to visually and thus manually identify whether the side wall has been changed in length or the loading bed has been altered. The marking can expediently be in the form of an imprint and/or of a measuring tape. The change in length or alteration visually identified in this way can be input manually into the controller, for example by means of a keyboard provided on the controller or via a mobile device app, which has a communication connection with the vehicle or the controller.

Similarly, the change in length or the alteration can be detected automatically by means of the proposed side-wall sensor or of the loading-bed sensor. In this connection, it is particularly preferred for the side-wall sensor and/or the loading-bed sensor to comprise a stepper motor, a lidar sensor and/or a light barrier, and/or for the side-wall sensor and/or for the loading-bed sensor to be designed to detect the change in length and/or the alteration on the basis of a change in an electrical resistance of the side wall and/or of the loading bed. The side-wall sensor or the loading-bed sensor preferably has a communication connection with the controller. The lidar sensor can be arranged beneath the loading bed. Furthermore, the lidar sensor can be configured to autonomously navigate the vehicle and in particular to detect obstacles in the environment of the vehicle.

In this way, a single lidar sensor can be used to sense both a change in length of the side wall, and an alteration in the loading bed and in the environment in order to navigate the vehicle. By applying a voltage to the side wall and/or the loading bed and measuring the change in electrical resistance, it is possible to determine the change in length of the side wall and/or the change in size of the usable area by computer means. The thus identified change in length of the side wall and/or alteration in the loading bed can be taken into consideration by the controller, in order to adapt the route to be navigated to the change in length of the side wall or alteration of the loading bed. The adapted route omits for example aisles in a logistics centre which do not have a sufficient passage width for the passage of the vehicle.

According to a preferred development, the loading bed has a fixed-size base surface made of a first material and a variable-size extension surface in particular made of a second material that is more flexible compared therewith. The base surface can be made for example of metal or wood, while the extension surface can be made of plastic and/or a tarpaulin. Similarly, the extension surface can be in the form of a roller shutter, a roller door or roller blind in order in this way to alter the size of the loading bed. Furthermore, the extension surface can comprise a rubber-like material, which, in the case of an altered-size loading bed, extends between the base surface and the side wall.

In order to configure the controller, various possibilities exist in principle. As discussed above, the controller comprises preferably a microcontroller and/or is designed in a computer-based manner in order to navigate the vehicle autonomously. To this end, the controller preferably has an "intelligence" such that the controller, optionally by means of optical, acoustic, olfactory and/or data-signal-based sensors, provided on the vehicle, for identifying and interpreting environmental signals, can navigate the vehicle to the destination without collisions with other vehicles or other items occurring in the process. According to a particularly preferred refinement, the controller is designed to make the vehicle follow a person at a predetermined distance.

The vehicle, which is configured for example as a picking cart for picking objects in a warehouse, can in this way follow a warehouse employee and/or a picker at a distance of 1 to 2 metres through a rack system of the logistics centre. The warehouse employee removes predetermined objects from the rack system and places them on the loading bed. If the picking cart is fully loaded or all of the objects from the rack system have been placed on the loading bed, the controller makes the picking cart travel independently to the destination. Furthermore, scenarios are also conceivable in which the vehicle independently follows a route in the warehouse on the basis of a previously received object list, such that the warehouse employee can remove objects from the rack system and place them on the vehicle at defined stopping points.

According to a further preferred refinement, the controller is designed to control the alteration and/or to alter the usable area depending on the object to be transported, in particular on the basis of a received object list. Preferably, the controller undertakes any control tasks arising on the vehicle that relate to the navigation, the alteration and adaptation of the route as per the altered loading bed. In order to receive the object list, the vehicle and/or the controller expediently has a communication device in order to exchange data, for example relating to the objects to be transported, wirelessly and/or in a wired manner with a logistics centre, a distribution station or the like.

In principle, the vehicle can have a combustion engine, in order to travel independently, for example on a road, to different locations along the route, even over relatively long distances. However, it has proven particularly advantageous for the vehicle to have a battery for the controller and a corresponding electromechanical drive that is powered by the battery. Preferably, the controller automatically detects when the battery needs to be charged, in order then to likewise automatically drive to a charging station and to connect itself electrically thereto in order to charge the battery.

BRIEF DESCRIPTION OF THE DRAWINGS

In the following text, the invention is explained in more detail with reference to the appended drawings on the basis of preferred exemplary embodiments.

In the Drawings

DETAILED DESCRIPTION OF THE DRAWINGS

Figure 1:
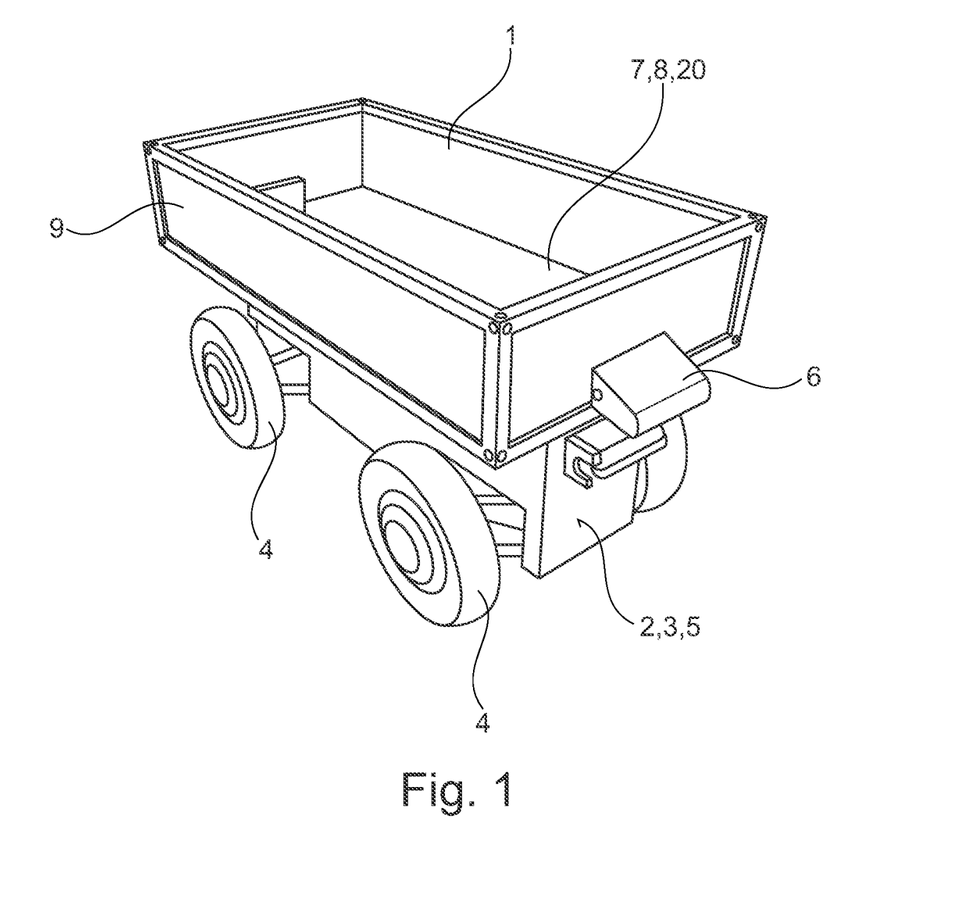
FIG. 1 shows a schematic-perspective view of a vehicle for the autonomous transport of an object according to a preferred exemplary embodiment of the invention.

FIG. 1 shows a schematic-perspective view of a vehicle for the autonomous transport of an object 1 to a destination according to a preferred exemplary embodiment of the invention. The vehicle is designed in the manner of a picking cart, also known as a cart, and has a box-like substructure 2. Provided in the substructure 2 is a drive 3 for four wheels 4 provided laterally on the substructure 2. Also arranged in the substructure 2 is a battery 5 for supplying the drive 3 and a controller 6 of the vehicle with electrical energy.

The computer-based controller 6 is designed to have the vehicle follow a picker at a predefined distance of a few metres. To this end, the vehicle has various sensors (not described in more detail below), which allow autonomous navigation of the vehicle between racks (not illustrated) in a warehouse. The picker removes the objects 1, for example piece goods, parcels or the like, from the racks, and places them on a box-like loading bed 7 placed on the substructure 2. The rectangular loading bed having a usable area 8 of 2 m$^2$ is circumferentially enclosed by side walls with a height of 30 centimetres, which bound the usable area 8 and adjoin the loading bed 7 without a gap. As shown in FIG. 1, objects 1 are able to be received on the loading bed 7 and secured against dropping off the vehicle by the side walls 9 during transport.

Figure 2:
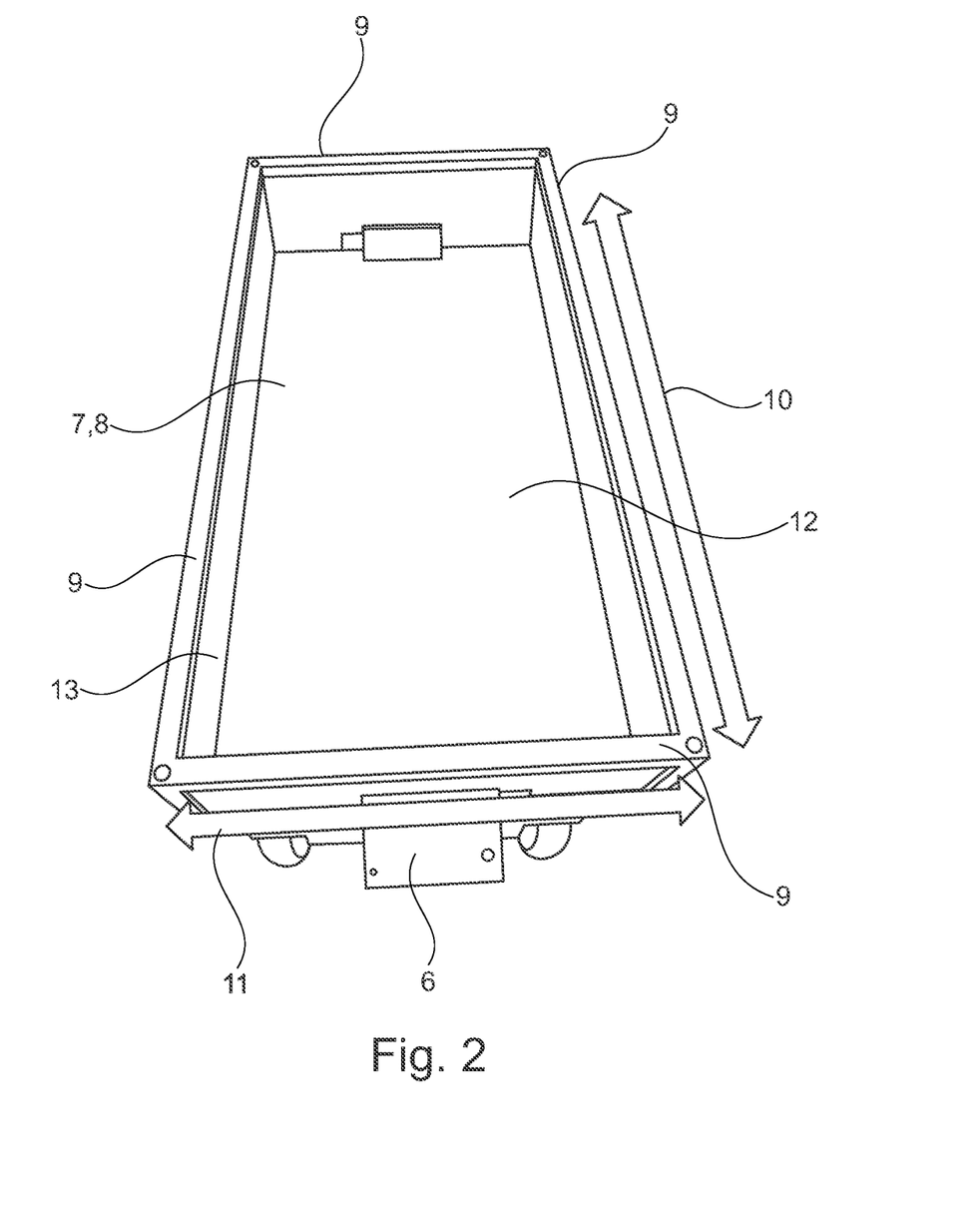
FIG. 2 shows a schematic-perspective plan view of the vehicle according to FIG. 1 according to the preferred exemplary embodiment of the invention.

In the starting position shown in FIG. 1, the loading bed 7 ends substantially flush with the wheels 4 in plan view with regard to its transverse extent, and does not project beyond them. In its longitudinal extent, apart from the controller 6, the loading bed 7 does not protrude beyond the longitudinal extent of the substructure 2. However, as shown in FIG. 2, the loading bed 7 is alterable in terms of its usable area bounded by the side walls 9. Specifically, a surface area of the loading bed 7 in the longitudinal direction, indicated by arrow 10, and in the transverse direction, indicated by arrow 11, of the loading bed 7 is variable in size.

In the event of a change in size of the usable area 8 in the longitudinal direction 10, the altered-size loading bed 7 accordingly projects beyond the substructure 2 (not shown). The same goes for a change in size of the usable area in the transverse direction 11 of the loading bed 7. While, in the starting position shown in FIG. 1, the side walls 9 of the longitudinal sides of the loading bed are arranged substantially vertically above the wheels 4, after a change in size of the usable area in the transverse direction of the loading bed 7, the side walls of the longitudinal sides of the loading bed 7 can be arranged next to the wheels 4 and accordingly project therebeyond in the transverse direction 11.

The alteration in the usable area 8, in particular the alteration in the surface area of the loading bed 7, does not, however, mean, in the scope of the invention, possible turning down of the side walls 9, which can likewise result in an increase in the usable area 8. This means that when the usable area 8 is altered, for example when the surface area of the loading bed 7 is increased, this is likewise accompanied by an elongation of the side wall 9. In the configurations shown in FIG. 1 and FIG. 2, the surface normals of the loading bed 7 and of the side wall 9 extend at a fixed angle of 90° to one another.

In order to alter the surface area of the loading bed 7 and the length of the side wall 9, there are various possibilities. For example, the loading bed 7 can be designed to be telescopically extendable or foldable. Similarly, the loading bed 7 and/or the side wall 9 can be configured in the manner of a roller shutter, a roller door or a roller blind. In addition, it is possible for the loading bed 7 to have a fixed-size base surface 12 made of a first material, for example of metal, and a variable-size extension surface 13 made of a second material that is more flexible compared therewith, such as rubber. If now, by way of example, the loading bed 7 is intended to be extended in the transverse direction 11, the rubber band which can be held between the fixed-size base surface 12 and the side wall 9 stretches.

Figure 3:
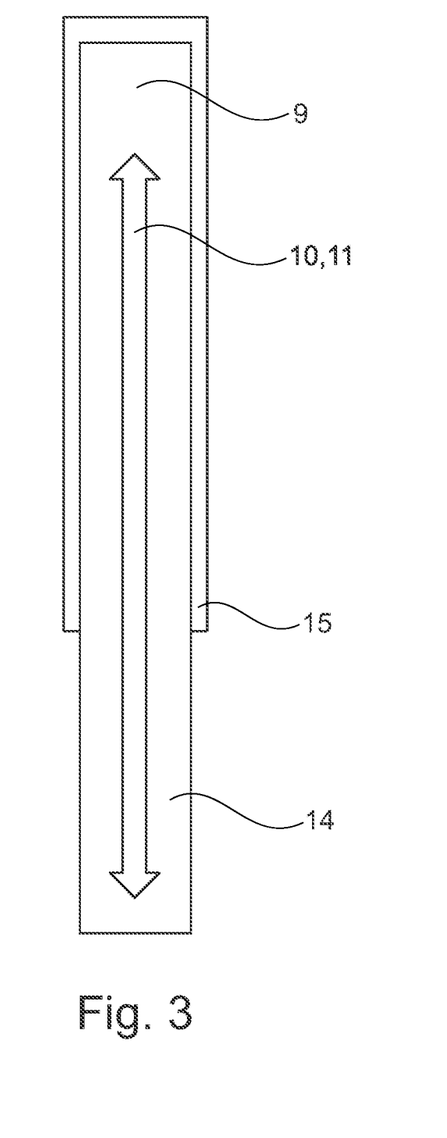
FIG. 3 shows a schematic plan view of a side wall of the vehicle according to FIG. 1 according to the preferred exemplary embodiment of the invention.

FIG. 3 shows a schematic sectional plan view of a side wall 9, having a first part 14 which is introducible in a second, outer part 15 of the side wall 9 or in the latter for changing the length of the side wall 9 in the longitudinal direction 10 or transverse direction 11. In the extended state shown in FIG. 3, both the first part 14 and the second part 15 are visible. The two parts 14, 15 can be embodied so as to be displaceable in a stepless manner and designed to be connected together, for example in a stepless manner by means of screwing, or in defined steps by means of corresponding latching means, in order to fix the first part with respect to the second part 15.

Figure 4:
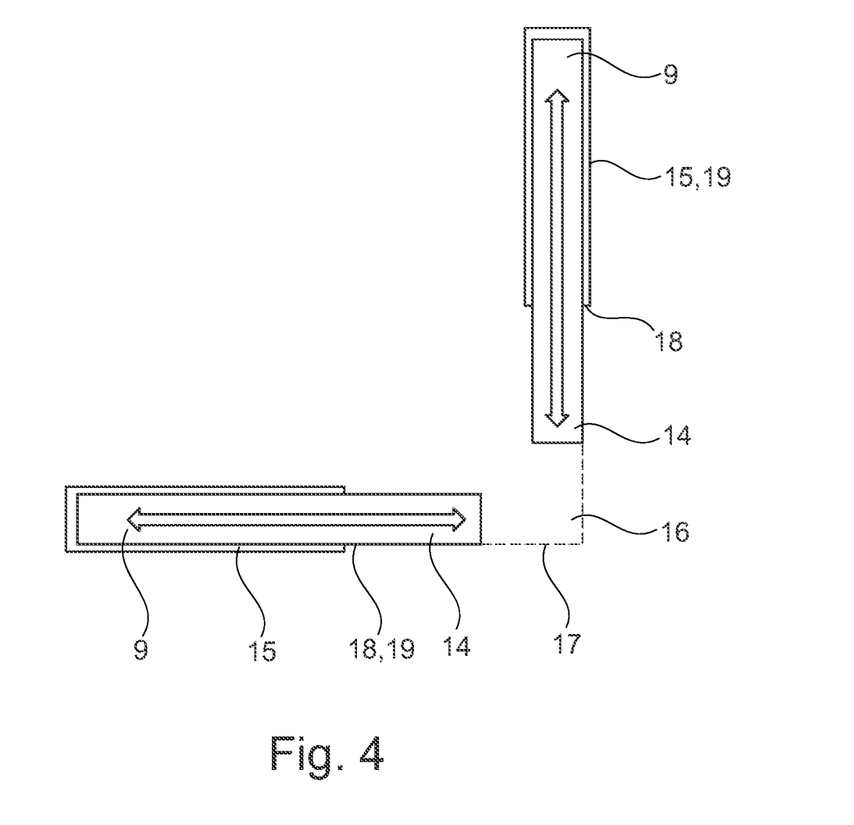
FIG. 4 shows a schematic plan view of two side walls of the vehicle according to FIG. 1 according to the preferred exemplary embodiment of the invention.

FIG. 4 shows a schematic sectional plan view of two side walls 9, wherein the two side walls are each embodied as described above with a first part 14 which is introducible into a second part 15. Between the respective first parts 14 of the side walls 9 that are arranged orthogonally to one another with regard to their surface normal, there is a gaping gap 16 at one corner of the loading bed 7, said gap 16 being closed by a side-wall extension 17, made of a rubber band, which seamlessly adjoins the two first parts 14. The loading bed 7, even though not shown, can be designed in a similar manner, for example have a folding mechanism, or have an extendable base part in order to close such a gap 16 in the loading bed 7.

In each case, with the above-described configurations, the usable area 8 can be changed in terms of its geometric shape and its surface area bounded by the side walls 9, in order, for example during transport from a first location to a destination, to alter the usable area 8 of the vehicle in accordance with the objects 1 to be transported.

Respective markings 18 in the form of a printed-on measuring tape are provided both on the side walls 9 and on the loading bed 7, in order to make it possible to visually recognize a change in length of the side walls 9 or a change in size of the loading bed 7. In addition, a side-wall sensor 19 is provided on each side wall 9 in order to detect the change in length of the particular side wall 9. Similarly, a loading-bed sensor 20 is arranged on the loading bed 7, an alteration in the surface area of the loading bed 7 being detectable by said sensor 20.

Both the side-wall sensor 19 and the loading-bed sensor 20 can be embodied as a stepper motor, which effects the change in length of the side wall 9 or the change in size of the loading bed 7. Likewise, the side-wall sensor 19 and the loading-bed sensor 20 can be configured as a lidar sensor, which, in addition to detecting the change in length or size, is also usable for detecting an environment of the vehicle for autonomous navigation. Moreover, it is also possible, by applying a voltage and measuring a change in an electrical resistance of the side wall 9 or of the loading bed 7, to detect the change in length or change in size.

As already discussed above, the controller 6 is embodied to navigate the vehicle autonomously within a logistics centre through aisles between the racks set up there or outside the logistics centre on public roads. By way of the lidar sensor, likewise already discussed, the vehicle independently senses environmental information in the environment of the vehicle and independently calculates, by means of the controller 6, a route to be followed, for example from a charging station, at which the battery 5 of the vehicle is charged, to a destination at which the picker starts his picking operation. The route is dependent on the external dimensions of the vehicle, in order that the latter can travel through aisles between the racks of the logistics centre.

As a result of the usable area 8 being altered, in particular upon an increase in the usable area 8 in the transverse direction 11, the vehicle widens. The controller 6 is embodied to take this widening of the vehicle, detected by the side-wall sensor 19 and/or the loading-bed sensor 20, into consideration when selecting the route. Specifically, when the usable area 8 is altered, the route to be navigated to the destination is adapted. This means that the route can remain unchanged, if the planned route is able to be followed in spite of the altered width of the vehicle. If the planned route comprises for example aisles between the racks of the logistics centre that are no longer passable for the vehicle on account of the increased width, the controller 6 automatically changes the route to the destination and excludes aisles with an insufficient passage width from the amended route.

In summary, the vehicle allows the autonomous transport of objects 1 in the form of piece goods, parcels, merchandise or other transportable goods in an extremely flexible manner and autonomously to a destination such that, for example during transport, the usable area 8 is dynamically alterable in size and the route to be followed is automatically adapted to changed dimensions of the vehicle, in order for example to leave out aisles or roads with an insufficient passage width.

The described exemplary embodiments are merely examples which can be modified and/or added to in multifarious ways within the scope of the claims. Each feature which has been described for a particular exemplary embodiment can be used independently or in combination with other features in any desired other exemplary embodiment. Each feature which has been described for an exemplary embodiment of a particular category can also be used in a corresponding manner in an exemplary embodiment of another category.

LIST OF REFERENCE SIGNS

Object 1
Substructure 2
Drive 3
Wheels 4
Battery 5
Controller 6
Loading bed 7
Usable area 8
Side wall 9
Longitudinal direction 10
Transverse direction 11
Base surface 12
Extension surface 13
First part 14
Second part 15
Gap 16
Side-wall extension 17
Marking 18
Side-wall sensor 19
Loading-bed sensor 20

We claim:

1. A vehicle for the autonomous transport of an object to a destination, having
    a loading bed for receiving the object,
    a side wall extending longitudinally and transversely around and above the loading bed and bounding a usable area of the loading bed, wherein the side wall adjoins the loading bed without a gap, wherein the side wall is arranged orthogonally to the loading bed, and
    a controller, wherein
    the loading bed is designed to change in size to alter a surface area of the usable area in both of a longitudinal direction and a transverse direction, wherein altering the surface area of the loading bed alters a length of the periphery of the loading bed, wherein the surface area of the loading bed is increasable and reducible in both the longitudinal direction and the transverse direction, wherein a marking is provided on the loading bed in order to visually display the alteration, and/or having a loading-bed sensor designed to detect the alteration, and wherein alterations in the surface area in the longitudinal direction are independent of the transverse direction and alterations in the surface area in the transverse direction are independent of the longitudinal direction, and wherein the side wall can change in length to match changes in the length of the periphery of the loading bed, and
    the controller is designed to navigate the vehicle to the destination along a route that takes the alteration in the usable area into consideration.

2. The vehicle according to claim 1, wherein the usable area and/or a surface area of the loading bed is alterable in the longitudinal direction and/or in the transverse direction of the loading bed, and/or the loading bed is designed to alter the size of the usable area.

3. The vehicle according to claim 1, wherein the loading bed is configured in a telescopically extendable and/or foldable manner for the purpose of alteration, in particular of altering the size.

4. The vehicle according to claim 1, wherein the loading bed and the side wall are arranged at a fixed angle to one another.

5. The vehicle according to claim 1, wherein the side wall peripherally bounds the loading bed and/or the usable area, and wherein the side wall is arranged in a foldable manner on the loading bed.

6. The vehicle according to claim 1, wherein the side wall is variable in length.

7. The vehicle according to claim 6, wherein, for changing its length, the side wall is configured in a telescopically extendable manner, configured in a foldable manner and/or made of a flexible material.

8. The vehicle according to claim 6, having at least two side walls which are arranged alongside one another on adjacent peripheral edges of the loading bed, and a side-wall extension that is made of a flexible material and is arranged between the two side walls.

9. The vehicle according to claim 6, wherein the side-wall sensor comprises a stepper motor, a lidar sensor and/or a light barrier, and/or the side-wall sensor is designed to detect the change in length and/or the alteration on the basis of a change in an electrical resistance of the side wall and/or of the loading bed.

10. The vehicle according to claim 1, wherein the loading bed has a fixed-size base surface made of a first material and a variable-size extension surface in particular made of a second material that is more flexible compared therewith.

11. The vehicle according to claim 1, wherein the controller is designed to make the vehicle follow a person at a predetermined distance.

12. The vehicle according to claim 1, wherein the controller is designed to control the alteration and/or to alter the usable area depending on the object to be transported, in particular on the basis of a received object list.

13. The vehicle according to claim 1, having a drive for the vehicle and a battery for the controller and the drive.

14. The vehicle according to claim 1, wherein the loading-bed sensor comprises a stepper motor, a lidar sensor and/or a light barrier, and/or the loading-bed sensor is designed to detect the change in length and/or the alteration on the basis of a change in an electrical resistance of the side wall and/or of the loading bed.

15. The vehicle according to claim 1, wherein a marking is provided on the loading bed in order to visually display the alteration, and/or having a loading-bed sensor designed to detect the alteration.

16. The vehicle according to claim 15, wherein the side-wall sensor and/or the loading-bed sensor comprises a stepper motor, a lidar sensor and/or a light barrier, and/or the side-wall sensor and/or the loading-bed sensor is designed to detect the change in length and/or the alteration on the basis of a change in an electrical resistance of the side wall and/or of the loading bed.

17. The vehicle according to claim 9, wherein the vehicle further comprises a sensor that senses environmental information in the environment of the vehicle and wherein the controller is adapted to navigate the vehicle based on both the sensed environmental information and the length of the side wall and/or the loading bed.

18. A vehicle for the autonomous transport of an object to a destination, having
- a loading bed for receiving the object,
- a side wall extending longitudinally and transversely around and above the loading bed and bounding a usable area of the loading bed, wherein the side wall adjoins the loading bed without a gap, wherein the side wall is arranged orthogonally to the loading bed and variable in length, and
- a controller, wherein
- the loading bed is designed to change in size to alter a surface area of the usable area in both of a longitudinal direction and a transverse direction, wherein altering the surface area of the loading bed alters a length of the periphery of the loading bed, wherein the surface area of the loading bed is increasable and reducible in both the longitudinal direction and the transverse direction and wherein alterations in the surface area in the longitudinal direction are independent of the transverse direction and alterations in the surface area in the transverse direction are independent of the longitudinal direction, and wherein the side wall can change in length to match changes in the length of the periphery of the loading bed, and
- the controller is designed to navigate the vehicle to the destination along a route that takes the alteration in the usable area into consideration, and
- wherein a marking is provided on the side wall in order to visually display the change in length, and/or having a side-wall sensor designed to detect the change in length.

* * * * *